UNITED STATES PATENT OFFICE.

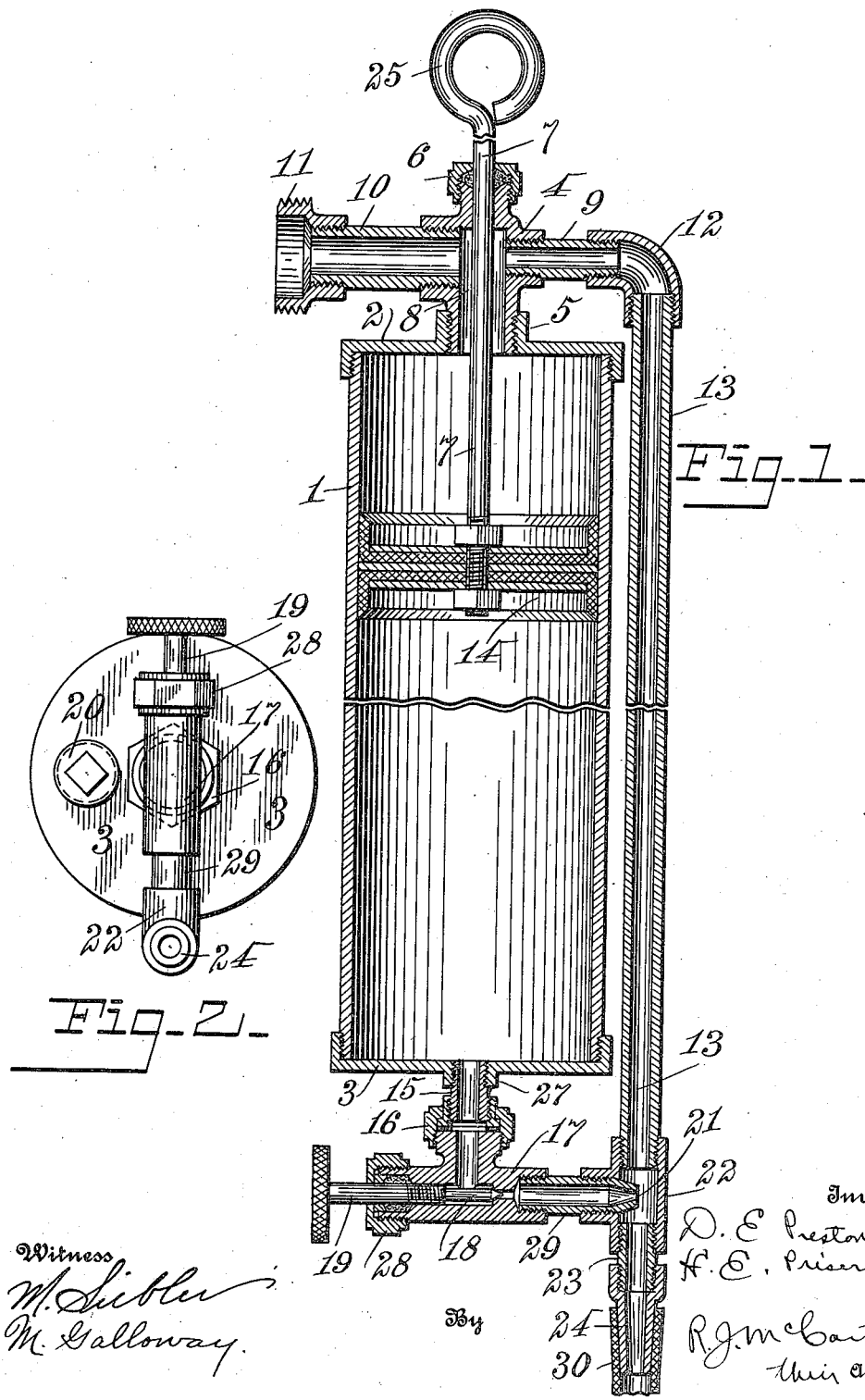

DARWIN E. PRESTON AND HARRY E. PRISER, OF DAYTON, OHIO.

SPRAYING APPARATUS.

1,241,551.   Specification of Letters Patent.   Patented Oct. 2, 1917.

Application filed June 13, 1916. Serial No. 103,406.

*To all whom it may concern:*

Be it known that we, DARWIN E. PRESTON and HARRY E. PRISER, citizens of the United States, residing at Dayton, in the county of Montgomery and State of Ohio, have invented certain new and useful Improvements in Spraying Apparatus; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain defined improvements in spraying apparatus for use in floral culture. The object of the invention is to produce a convenient spraying apparatus for spraying plants, flowers, etc., in hot-houses with an insecticide solution and one that can be easily and conveniently manipulated.

Referring to the accompanying drawings, Figure 1 is a sectional elevation of the reservoir for the insecticide solution together with the piping and the connections; and Fig. 2 is a bottom plan view of the reservoir showing the outlet piping and connections which are controlled by a valve.

In a detail description of the invention, similar reference characters indicate corresponding parts.

Referring more particularly to the drawings, 1 designates a tank or container for the spraying solution such, for example, as nicotin or a solution of tobacco. This container is preferably about two inches in diameter and about fourteen inches long, having, therefore, the semblance of a pipe. The bottom 3 of the container which is fixed has an inlet through which the solution is introduced and which inlet is closed by a screw-plug 20. The top of the container is closed by a cap 2 which has a screw-threaded connection with the cylinder or container 1 and has an apertured boss 5 which receives an exteriorly screw-threaded end of a multiple pipe connection 4. The pipe connection 4 has a vertical chamber 8 which communicates with the interior of the container 1 and with two lateral pipe openings which receive pipes 10 and 9. The pipe 10 screws into one of said lateral openings on one side of the connection 4 and receives water from the hydrant under pressure, said pipe 10 having a coupling member 11 which enables a connection to be made between the pipe 10 and the source of water supply. The pipe 9 which is of smaller bore is screwed into the opposite lateral pipe opening in the connection 4 and the water passing out through the pipe 9 enters a conduit 13 which is connected to the pipe 9 by an elbow-fitting 12 and extends along the side of the container. It will thus be seen that the water entering the pipe 10 will discharge into the chamber 8 and thence into the upper portion of the container 1 and will also discharge into the pipe 9 and thence into the conduit 13. The upper end of the multiple pipe connection 4 is provided with a stuffing gland 6. The piston 14 within the container is moved downwardly under the pressure of the water entering the container from the chamber 8. This downward movement of the piston discharges the insecticide solution in a manner presently described. Connected with the piston 14 is a rod 7 which passes through the fitting 4 and the stuffing gland at the top thereof and is provided with a ring or finger-hold 25 by means of which the piston is elevated after it has been forced downwardly in the container to the limit of its discharge operation. The bottom of the container is provided with an internal screw-threaded boss 27 which receives a nipple 15 to which a valve-casing 17 is connected by a coupling member 16, to afford an outlet for the solution from the container. A needle-valve 18 controls this outlet and extends across the path of the discharge from the container. The stem 19 of this valve passes through a stuffing box 28 in the end of the valve casing and the point thereof seats in the opposite end of the casing. The valve casing 17 is connected with the water conduit 13 by means of a nipple 29 which is screwed into a T-fitting 22 which connects with the discharge end of the conduit. The T-fitting 22 has a chamber 21 into which the solution from the container 1 is discharged at a right angle and intercepts the water passing through the conduit 13, the chamber 21 being, more properly speaking, a mixing chamber wherein the tobacco solution or nicotin from the container 1 is commingled with the water and is discharged in a proper consistency upon the plants. The T-fitting 22 is connected to a hose connection 24 by means of a nipple 23. A suitable length of hose 30 extends from the hose connection 24 and through this the solution is conducted to the various parts of the hot-house.

Having described our invention, we claim.

A spraying apparatus comprising a container adapted to hold a spraying solution, a piston in said container adapted to act upon said solution to cause its discharge from one end of said container, a rod extending from said piston and affording means for restoring the piston to the normal position, a chambered member mounted on the cover of said container and through which said piston rod extends, said chambered member communicating with the upper end of the container and having oppositely disposed lateral pipe-connecting apertures, an inlet pipe connected with one of said lateral apertures and through which water under pressure is discharged to said chambered member and thence to the upper portion of the container, an outlet pipe of smaller diameter connected with the other of said lateral apertures and also receiving a portion of the water driven to said chambered member, a pipe connected to said outlet pipe and forming a water conduit from said chambered member, a valve casing coupled to an outlet aperture in the other end of said container, a nipple connected to and forming an outlet from said valve casing, a chambered fitting forming a connection between said water conduit, said valve casing and a hose coupling, and wherein the solution from the container and the water passing through the conduit are mixed, and a needle-valve within said valve casing controlling the outlet from the container to said mixing chamber, as herein shown and described.

In testimony whereof we affix our signatures in presence of two witnesses.

DARWIN E. PRESTON.
HARRY E. PRISER.

Witnesses:
MELLIE GALLOWAY,
M. SIEBLER.